(12) United States Patent
Nishimura et al.

(10) Patent No.: US 7,410,605 B2
(45) Date of Patent: Aug. 12, 2008

(54) SOLUTION FILM-FORMING METHOD

(75) Inventors: Takuro Nishimura, Minami-Ashigara (JP); Tadahiro Tsujimoto, Minami-Ashigara (JP); Yukihiro Katai, Minami-Ashigara (JP)

(73) Assignee: FUJIFILM Corporation, Tokyo (JP)

( * ) Notice: Subject to any disclaimer, the term of this patent is extended or adjusted under 35 U.S.C. 154(b) by 42 days.

(21) Appl. No.: 10/620,412

(22) Filed: Jul. 17, 2003

(65) Prior Publication Data

US 2004/0023051 A1 Feb. 5, 2004

(30) Foreign Application Priority Data

Jul. 19, 2002 (JP) ............................... 2002-210550

(51) Int. Cl.
  *B01D 37/02* (2006.01)
(52) U.S. Cl. ....................... 264/217; 210/777; 210/778; 210/193
(58) Field of Classification Search .................. 210/777, 210/778
  See application file for complete search history.

(56) References Cited

U.S. PATENT DOCUMENTS

2004/0023051 A1* 2/2004 Nishimura et al. .......... 428/500

OTHER PUBLICATIONS

Handbook of Separation Techniques for Chemical Engineers, 2nd Edition (1988), McGraw Hill, pp. 4-9 through 4-14.*

* cited by examiner

*Primary Examiner*—Robert James Popovics
(74) *Attorney, Agent, or Firm*—Sughrue Mion, PLLC (57) ABSTRACT

The solution film-forming method is provided in which the absolute filtration accuracy for a cellulose acylat solution can be improved and filtration throughput can be increased without reducing the pore size of a filtering material. A dope stock solution to be filtrated is first introduced into a body feed tank and a filter aid from a filter aid tank is added and dispersed. As the filter aid, an aid including SiO2 in 50% or more and a cellulose-based aid are mixed for use. The dope stock solution in which the filter aid is dispersed is introduced into a filter machine and subjected to filtration while forming a cake on the surface of the filtering material. After the filtration, a cleaning solvent is supplied in circulation from a cleaning solvent tank, and the cake is discharged as slurry. The filter aid is separated from the slurry by a separating device and burned in a burning device. Then, a regenerated filter aid is sent to the filter aid tank. After the cleaning, a precoat liquid in which the filter aid is dispersed is supplied from a precoat tank to the filter machine to form a precoat layer on the surface of the filtering material.

28 Claims, 3 Drawing Sheets

SOLUTION FILM-FORMING METHOD

BACKGROUND OF THE INVENTION

1. Field of the Invention

The present invention relates to a solution film-forming method, in particular to a solution film-forming method for producing a cellulose acylate film used for a liquid crystal display device and a photosensitive material.

2. Description of the Related Art

In a process for producing a cellulose acylate film, a cellulose ester flake is first dispersed in a solvent and the mixture is stirred, preparing a cellulose acylate solution. Next, the cellulose acylate solution is subjected to filtration to remove foreign matters, thereby eliminating the possibility of defects in the film after film-formation. The filtered cellulose acylate solution is then formed to a film by co-casting or the like and the film is dried, thereby producing a cellulose acylate film.

The above-described filtration of the cellulose acylate solution is carried out for the purpose of removing foreign matters in a dope such as undissolved matters and insoluble matters, thereby preventing the occurrence of defects in the formed film. As a filtering material for the filtration, filter paper, filter cloth, sintered metal or the like is used. In any filtering material, pores of the filtering material may be plugged with time, causing a sudden increase of pressure difference in the later half of the filtration. Thus, it is necessary to periodically pass a cleaning solution through the filtering material to clean the filtering material to regenerate it.

Filtering materials having an absolute filtration accuracy of approximately 0.01 mm have been used in the current filtration. The filtration accuracy required is expected to be higher in future. In particular, for the cellulose acylate film for a liquid crystal display of recent years, high quality is required compared with the cellulose acylate film for photography, so that the absolute filtration accuracy needs to be improved.

However, a reduction of the pore size of a filtering material for the purpose of improving the absolute filtration accuracy will soon make the filtering material plugged, extremely reducing the life of filtration. In addition, the process for producing the cellulose acylate film has become faster in recent years, causing a reduction of time until occurrence of filtration plugging. The reduction of the time to the plugging of the filtration material increases cleaning frequency, thereby increasing the load for operators.

Furthermore, when the pore size of a filtering material is reduced, there will be such problems that high filtration pressure is necessary and it takes a long time in filtration, thereby reducing productivity.

SUMMARY OF THE INVENTION

The present invention has been created in view of these circumstances, and it is an object of the present invention to provide a solution film-forming method in which the absolute filtration accuracy for a cellulose acylate solution can be improved and filtration throughput can be increased without reducing the pore size of a filtering material.

In order to attain the above-described object, the present invention is directed to a solution film-forming method for producing a cellulose acylate film in which a cellulose acylate solution is prepared and subjected to filtration before subjected to film-forming, wherein a filter aid is used in the filtration.

According to the present invention, the plug of a filtering material can be suppressed since the filtration of a cellulose acylate solution is carried out using a filter aid. Therefore, a sudden increase of pressure in the latter half of the filtration can be suppressed, allowing increase of the life of filtration. In addition, the filtration using the filter aid can achieve high filtration accuracy by a sieve effect by physical clearances formed between the foreign matters contained in the cellulose acylate solution and the filter aid or an adsorption effect created by heir interaction with the filter aid. Further, the filtration using the filter aid can reduce the load for operators since a cake can be peeled by backwash or rotation of a filtering material, allowing the system to be cleaned while remaining closed.

Preferably, the filter aid has the composition including $SiO_2$ in 50% or more. $SiO_2$ can adsorb insoluble matters in a cellulose acylate solution, thereby allowing the decrease of impurities. Thus, the quality of a formed film can be improved. The percentage of $SiO_2$ is more preferably 70% or more, most preferably 90% or more.

Preferably, a cellulose-based aid is used as a filter aid, thereby allowing the adsorption of insoluble matters in a cellulose acylate solution.

Preferably, a mixture of the cellulose-based aid and the aid including $SiO_2$ in 50% or more is used. Such a mixture system can form a robust cake layer. The aid including $SiO_2$ in 70% or more is more preferably used, most preferably 90% or more.

Preferably, the filter aid comprising a mixture of a plurality of filter aids is used. The use of a mixture of filter aids having different particle sizes can extend the filtration life of a cake. In addition, the efficiency of filtration can be improved by placing the aid having larger particle size in the upstream side and placing the aid having smaller particle size in the downstream side.

Preferably, the average particle size of the filter aid is defined in the range of from 1 to 150 μm. If the average particle size of the filter aid is smaller than this range, a cake layer is closely packed to increase the resistance of filtration, thereby requiring high filtration pressure, resulting in upsizing of the apparatus. Conversely, if the average particle size of the filter aid is too large, the clearance of the cake layer becomes large, reducing the accuracy of filtration. Therefore, when filtrating a cellulose acylate solution, it is preferable to use the filter aid having an average particle size in the range described above. The average particle size herein means the average particle size of the aggregate made by combining atoms or molecules. The average particle size of the filter aid is more preferably in the range of from 10 to 100 μm, most preferably in the range of from 20 to 50 μm.

Preferably, the filter aid has a standard deviation of particle size of 0.5 times an average particle size or smaller. The smaller the standard deviation, the smaller the variations in particle sizes of the filter aid, so that stable cakes can be formed. The standard deviation is more preferably 0.4 times the average particle size or smaller, most preferably 0.3 times the average particle size or smaller.

Preferably, the filter aid has a bulk density in a range of from 0.01 to 0.8 g/cm$^3$. If the bulk density is lower than this range, voids of a cake become large, reducing the accuracy of filtration. Conversely, if the bulk density is too high, the resistance of filtration becomes high resulting in upsizing of the apparatus. Therefore, when filtrating a cellulose acylate solution, the average particle size of the filter aid is preferably within the above-described range. The bulk density is more preferably in the range of from 0.1 to 0.5 g/cm$^3$, most preferably in the range of from 0.3 to 0.4 g/cm3.

Preferably, the filter aid is added to the cellulose acylate solution in an amount of from 0.01 to 10% by weight. If the addition quantity is smaller than this range, the effect for preventing plug by the filter aid is hardly obtained. Conversely, if the addition quantity is too large, the amount of the increase rate in the thickness of a cake layer is large, and the resistance of the cake sharply increases with the increase of the thickness, so that cleaning and discharge of the cake must be carried out frequently. Therefore, the addition quantity of the filter aid is preferably within the range described above. The addition quantity of the filter aid is more preferably in the range of from 0.05 to 5% by weight, most preferably in the range of from 0.1 to 0.5% by weight.

Preferably, a filtration support is precoated in a thickness of from 0.1 to 10 mm using a precoat liquid in which the filter aid is dispersed. If the thickness of the precoat is smaller than this range, initial filtration accuracy will become inferior. Conversely, if it is too thick, initial resistance will be high, resulting in upsizing of the apparatus. Therefore, the thickness of the precoat is defined as described above. The thickness of the precoat is preferably in the range of from 0.5 to 5 mm, more preferably in the range of from 1 to 2 mm.

Preferably, the precoat liquid has a terminal velocity of the filter aid in a range of from $10^{-4}$ to 1 cm/s. If the terminal velocity is larger than this range, a uniform precoat layer cannot be formed. Conversely, if it is too small, it takes much time until the precoat layer is formed, which is not practical. Therefore, a uniform precoat layer can be formed quickly by defining the terminal velocity of the filter aid as described above. The terminal velocity of the filter aid is more preferably in the range of from $10^{-4}$ to $10^{-2}$ cm/s, most preferably in the range of from $10^{-4}$ to $10^{-3}$ cm/s.

Preferably, a filtration support is precoated in a mass of from 0.1 to 5 kg/m² using a precoat liquid in which the filter aid is dispersed. If the precoat is lighter than this range, initial filtration accuracy will become inferior. Conversely, if it is too heavy, initial resistance will be high, resulting in upsizing of the apparatus. Therefore, the mass of the precoat is defined as described above. The mass of the precoat is more preferably in the range of from 0.5 to 2 kg/m².

Preferably, a flow rate in the filtration is in a range of from 0.1 to 50 hr. If the flow rate of filtration is smaller than this range, the efficiency of filtration drops. Conversely, if it is too high, the filtration accuracy will drop or filtration pressure will become very large, so that it is preferable to define in the above-described range. The flow rate of filtration is more preferably in the range of from 0.5 to 30 cm/hr, most preferably in the range of from 1 to 15 cm/hr.

Preferably, initial pressure difference in the filtration is in a range of from 0.01 to 1 MPa. The accuracy of filtration can be improved by setting the initial pressure difference of filtration in such a low range. In addition, it is possible to provide a wide pressure range for subsequent filtration, allowing achieving a long-time filtration and a large filtration throughput. Here, the initial pressure difference of filtration means the pressure difference between the primary side and the secondary side of a filtering material at the initial stage of filtration. The initial pressure difference of filtration is more preferably in the range of from 0.01 to 0.5 MPa, most preferably in the range of from 0.01 to 0.1 MPa.

Preferably, filtration pressure in the filtration is in a range of from 0.01 to 4 MPa. If the filtration pressure is higher than this range, the equipment cost to provide resistance to pressure will become higher, resulting in upsizing of the apparatus. Conversely, if it is too low, a cellulose acylate solution may boil. Here, the filtration pressure means the pressure at the primary side of a filtering material. The filtration pressure is more preferably in the range of from 0.01 to 2 MPa, most preferably in the range of from 0.01 to 1 MPa.

Preferably, pressure difference in the filtration is in a range of from 0.01 to 3 MPa. If the pressure difference of filtration is larger than this range, a cake layer will become flat. Consequently, the cake is compressed and closely packed, causing further increase of the pressure difference of filtration. In addition, the inside of the layer is disturbed when the cake becomes flat, resulting in inclusion of a filter aid into the dope after filtration. Conversely, if the pressure difference of filtration is smaller than the above-described range, the cake layer may be peeled off. Therefore, the cake layer can be formed stably by defining the pressure difference of filtration as described above. Here, the pressure difference of filtration means the difference between the primary side pressure and the secondary side pressure of a filtering material.

Preferably, a thickness of a cake layer in the filtration is in a range of from 0.1 to 80 mm. If the thickness of the cake layer is larger than this range, pressure drop will become larger, requiring higher filtration pressure. Conversely, if the thickness of the cake layer is too small, the filtration accuracy will decrease. For controlling the thickness of the cake layer in the above-described range, the cake layer may be exchanged by the time the thickness reaches 80 mm.

Preferably, the filtration is carried out in a pressure condition where the cellulose acylate solution does not boil and at a temperature 20° C. lower than a boiling point of the cellulose acylate solution at normal pressure or higher. The higher the filtration temperature, the more the viscosity of the liquid drops and the resistance of a cake is reduced, so that increase of the pressure difference of filtration can be suppressed.

Preferably, the filter aid is dispersed in the cellulose acylate solution at a temperature in a range of from a boiling point of the cellulose acylate solution at normal pressure to a temperature 20° C. lower than the boiling point. When the filter aid is dispersed at a temperature in the above described temperature range, the air dissolved in the cellulose acylate solution is foamed using the filter aid as a nucleus, thereby deaerating the cellulose acylate solution. Thus, the effect is not only to extend the life of filtration but also to allow performing simultaneous deaeration. Further, it is preferable that the filtration is carried out after saturation of dissolved air bubble in the cellulose acylate solution is reached 90% or lower, so that the foaming at filtration can be suppressed as much as possible, thereby preventing the drop of film quality associated with the foaming. The saturation of the dissolved air bubble for carrying out filtration is more preferably 80% or less, most preferably 70% or less.

Preferably, the filtration is carried out at a temperature lower than that for dispersing the filter aid in the cellulose acylate solution, that is, in an environment where the foaming occurs more hardly by than during dispersing the filter aid. This can prevent the foaming during filtration and improve the quality of the film.

Preferably, a concentration of the filter aid in the cellulose acylate solution is 10,000 particles/cm³ or less after the filtration. Deterioration of a formed film or defects due to inclusion of foreign matters can be prevented by suppressing the leak of the filter aid. The concentration of the filter aid is more preferably 5,000 particles/cm³ or less, most preferably 1,000 particles/cm³ or less.

Preferably, the cellulose acylate solution after the filtration is subjected to post-filtration by a filter having an absolute filtration accuracy of from 2 to 50 µm. Thus, a filter having an absolute filtration accuracy of from 2 to 50 µm is provided as a trap for the filter aid after the filtration to carry out post-filtration, so that the leaked filter aid can be collected, preventing the filter aid to be included in a film. The absolute filtration accuracy is more preferably from 2 to 30 μm, most preferably from 5 to 15 μm.

Preferably, a filter machine in which the filtration has been carried out is backwashed with a cleaning solvent, and the cleaning solvent is supplied in circulation, in a pressure condition where the cleaning solvent does not boil, after being heated to a temperature 20° C. lower than a boiling point of the cellulose acylate solution or higher. Thereby, the peeled cake can be efficiently discharged as slurry. The container for filtration has conventionally been opened for exchanging a filtering material, so that an organic solvent may come out of the container, causing work environment to be deteriorated and work time to be extended. However, in the present invention, the cake can be moved through piping as slurry, so that it can be moved and treated in a closed system. Thus, good work environment can be maintained and work time can be reduced.

Preferably, the cleaning solvent is a non-chlorine organic solvent. Recent years, it is desired to use non-chlorine solvent in view of environmental impact. The non-chlorine organic solvent may be used for any of a cellulose acylate solution, a precoat liquid, a body feed liquid or a cleaning solvent, but it is preferred to use the non-chlorine solvent for all of them. When a non-chlorine dope is used, more noticeable effect of the above-mentioned decoration can be obtained, since the dope is prepared by a cooling dissolution process, and a large amount of gas is dissolved therein.

Preferably, a cake formed on a filtration support by the filtration is discharged as slurry having a concentration in a range of from 1 to 50 kg/m$^3$. If the concentration of the slurry during discharge is lower than this range, the efficiency of cake discharge becomes worse. Conversely, if the concentration is too high, the particles in the slurry may aggregate. Therefore, the cake can be efficiently and securely discharged by defining the concentration of the slurry within the above-described range.

Preferably, the slurry is reused as at least one of a precoat liquid and a body feed liquid. The concentration of the slurry is more preferably in the range of from 10 to 40 kg/m$^3$, most preferably in the range of from 20 to 30 kg/m$^3$.

Preferably, the discharged slurry of the cake is separated to solvent and the filter aid, and the filter aid is then burned at 400° C. or higher for reuse. Thus, the efficiency for regenerating the filter aid can be improved.

Preferably, the burned filter aid is mixed with a virgin filter aid for use. Thus, the cost can be reduced without deteriorating the performance as a filter aid.

Preferably, the cellulose acylate solution that has been subjected to the filtration is formed to a film by co-casting. The formed cellulose acylate film can satisfy high quality as a number of bright point defects observed under crossed-Nicol having a size of 20 μm or more is 0 defect/5 cm$^2$, 10 μm or more is 10 defects/5 cm$^2$ or less, and 5 μm or more is 10 defects/5 cm$^2$ or less, a number being an average of five samples of 5 cm$^2$ in a width direction. Hence, the film can be used as a protective film for a polarizing plate. The polarizing plate can be used to produce a liquid crystal display device. In addition, the formed cellulose acylate film can be used to produce an optical compensation film. Further, the optical compensation film can be used to produce a liquid crystal display device. Furthermore, the formed film can be used for a photosensitive material.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Figure 1:
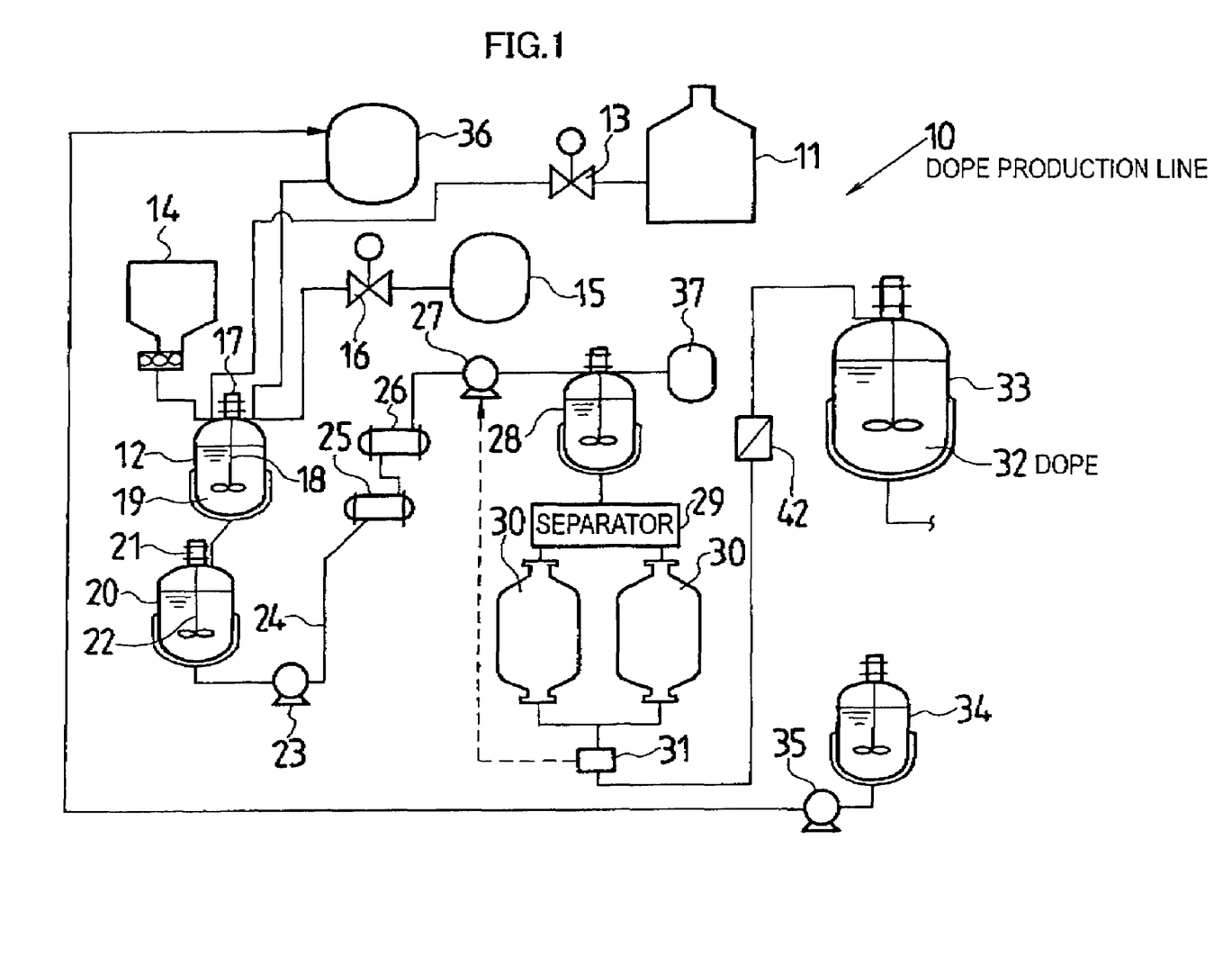
FIG. 1 illustrates a block diagram of dope production line applying the cleaning method for the filter machine according to the present invention.

Preferred embodiments of the solution film-forming method according to the present invention will now be described in detail with reference to the accompanying drawings. FIG. 1 illustrates the entire block diagram of a dope production line 10 in which the solution film-forming method according to the present invention is employed.

As illustrated in FIG. 1, the dope production line 10 is provided with a solvent tank 11, a metering device 14, and a plasticizer tank 15.

A solvent is stored in the solvent tank 11. The main solvent in this solvent may be chlorine organic solvents or non-chlorine organic solvents. Here, the chlorine organic solvents generally mean halogenated hydrocarbon compounds, and include, for example, dichloromethane (methylene chloride) and chloroform. The non-chlorine organic solvents include esters (for example, methyl acetate, methyl formate, ethyl acetate, amyl acetate, and butyl acetate), ketones (for example, acetone, methyl ethyl ketone, and cyclohexanone), ethers (for example, dioxane, dioxolane, tetrahydrofuran, diethyl ether, and methyl-t-butyl ether), and alcohols (for example, methanol, ethanol, and butanol). The non-chlorine organic solvents may be used singly (100% by weight) or in combination with esters, ketones, ethers, or alcohols having 1 to 6 carbon atoms. The aforementioned chlorine organic solvents and non-chlorine organic solvents can be used in combination. Further, solvent are not limited to the above-mentioned types.

Polymer is charged in the metering device 14. A cellulose ester, particularly cellulose acylate, is preferably used as the polymer. Further, cellulose acetate is preferably used among the cellulose acylate. It is the most preferable to use cellulose triacetate (TAC) having an average oxidation degree of from 57.5 to 62.5% (degree of substitution: 2.6 to 3.0). Here, the oxidation degree means the quantity of bonded acetic acid per cellulose unit weight, in accordance with the measurement and calculation of the degree of acetylation in ASTM:D-817-91 (methods of testing cellulose acetate and the like). As the polymer, a cellulose acylate particle is used in the present invention. Ninety percent by weight or more of the particles to be used preferably have a particle size of from 0.1 to 4 mm, more preferably from 1 to 4 mm. Further, the particles having a particle size of from 0.1 to 4 mm are preferably included in 95% by weight or more, more preferably in 97% by weight or more or in 98% by weight or more, and most preferably in 99% by weight or more. Furthermore, the particles having a particle size of from 2 to 3 mm is preferably included in 50% by weight or more of the particles to be used, more preferably in 70% by weight or more or in 80% by weight or more, and most preferably in 90% by weight or more. The shape of the particles of cellulose acylate is preferably close to a sphere as much as possible.

A plasticizer is stored in a plasticizer tank 15. The plasticizers include ester phosphates (for example, triphenyl phosphate, tricresyl phosphate, cresyldiphenyl phosphate, octyldiphenyl phosphate, diphenylbiphenyl phosphate, trioctyl phosphate, and tributyl phosphate), phthalates (diethyl phthalate, dimethoxyethyl phthalate, dimethyl phthalate, and dioctyl phthalate), glycolates (for example, triacetin, tributyrin, butyl phthalyl ethyl glycolate, ethyl phthalyl ethyl glycolate, methyl phthalyl ethyl glycolate, and butyl phthalyl butyl glycolate), and other plasticizers. Additives other than plasticizers may be added. The other additives include UV absorbers, mold release agents, release promoting agents, fluorine-based surface active agents and the like, which may be added in any stage from that before dope preparation to that after the dope preparation.

The solvent in the solvent tank 11, the polymer in the metering device 14, and the plasticizer in the plasticizer tank 15 are individually fed to a solution tank 12. At this time, the flow rate of the solvent is adjusted with a flow control valve 13, and the flow rate of the plasticizer is adjusted with a flow control valve 16. In addition, the polymer is metered and fed to the solvent tank 11. The quantity of the polymer is preferably from 15 to 20% by weight relative to the solvent in terms of the quality of the film product formed. Further, the quantity of the plasticizer is preferably from 5 to 20% by weight in terms of the flexibility of the film product. The order to feed them into the solution tank 12 is not limited, but it is preferred, for example, to deliver the solvent to the solution tank 12 first, and then the polymer is fed before the plasticizer is supplied. Also, the plasticizer may be added as necessary, and other additives may also be added.

The solution tank 12 is provided with a stirring blade 18 rotated by a motor 17. The solvent, polymer and plasticizer in the solution tank 12 are stirred with the rotation of the stirring blade 18. This makes a roughly dissolved state, that is, a state where solutes such as the polymer are not completely dissolved in the solvent.

A roughly dissolved solution 19 prepared by rough dissolution in the solution tank 12 is temporarily stored in a storage tank 20. Thus, the solution tank 12 becomes empty, allowing a continuous batch process in which the roughly dissolved solution 19 is repeatedly formed. The storage tank 20 is also provided with a stirring blade 22 rotated by a motor 21, allowing the roughly dissolved solution 19 stored to be stirred to a uniform solution.

The roughly dissolved solution 19 in the storage tank 20 is delivered to a heater 25 through piping 24 by operating a pump 23. The heater 25 to heat the roughly dissolved solution 19 includes an inline mixer such as a multi-tube type heat exchanger (shell-and-tube type) or a static-type mixer (static mixer). The heating temperature is preferably from 50 to 120° C. and the heating time is preferably from 5 to 30 minutes. These conditions allow the solute such as the polymer required for film-forming to be dissolved completely without any deterioration, preparing a dope stock solution. The piping 24 may be insulated or heated, thereby heating the roughly dissolved solution 19 flowing the piping 24 to enhance the dissolution of the solute.

The dope stock solution prepared by the heater 25 is sent to a cooler 26, where it is cooled to the boiling point of the major solvent constituting the dope stock solution or below. The cooled dope stock solution is sent to a body feed tank 28 by operating a pump 27.

The body feed tank 28 is connected with a filter aid tank 37, from which a filter aid is delivered. The filter aid is an inactive powder or particle to improve filtration performance and speed by forming a porous bed on a filtering material, and for example a mixture of the aid including silicon dioxide ($SiO_2$) in 50% or more and a cellulose-based aid is used. In addition, the filter aid having an average particle size of from 1 to 150 µm is used. Use of the aid having a fine average particle size allows a cake layer having small voids to be formed, resulting in increase of filtration resistance, reducing filtration speed. Conversely, use of the filter aid having a large average particle size allows a cake layer having large voids to be formed, resulting in the reduction of filtration accuracy.

In addition, the filter aid including particles having a standard deviation of 0.5 times the average particle size or smaller is used. If the standard deviation of the particle size is smaller, variations in particle sizes are smaller, so that stable cakes cannot be formed.

Further, the filter aid having a bulk density in the range of from 0.01 to 0.8 $g/cm^3$ is used. If the bulk density is lower than this range, a cake layer having large voids is formed, reducing the accuracy of filtration. Conversely, if the bulk density is too high, a cake layer having small voids is formed, causing easy increase of the pressure difference of filtration. The filter aid may include only the aid having silicon dioxide in 50% or more, or may include only the cellulose-based aid, or flyash or sand may be used as the filter aid.

The filter aid is added in the percentage of from 0.01 to 10% by weight relative to the dope stock solution in the body feed tank 28. If the addition amount is too small, the preventive effect on plugging with the filter aid is hardly attained. If the addition quantity is too large, on the other hand, the amount of the increase in the thickness of a cake layer becomes large, causing a problem of the increase of filtration resistance.

The dope stock solution to which the filter aid is added is stirred with a stirring blade 41 of the body feed tank 28. This disperses the filter aid uniformly. At this time, the agitation is carried out at a temperature in the range from the boiling point of a cellulose acylate solution (dope) at normal pressure to 20° C. lower than the boiling point. When the filter aid is dispersed in such a temperature range, the air dissolved in the dope stock solution becomes air bubbles by using the filter aid as a nucleus, thereby deaerating the solution. Then, after the saturation of dissolved air bubble in the dope stock solution is reached 90% or lower, the dope stock solution is delivered to a filter machine 30 through a selector 29.

Two of the filter machine 30 are installed in parallel and the filter machine 30 to which the dope stock solution is supplied is selected by the selector 29. As the filter machine 30, for example, a multi-filter type device is used, and as a filtering material for the filter machine 30, filter paper, filter cloth, sintered metal or the like is used. Here, the filtering material for the filter machine 30 means a support for a cake layer. The filter machine 30 is not limited to two, but three or more filter machine 30 may be installed in parallel.

When the dope stock solution is supplied to the filter machine 30, insoluble matters contained in the dope stock solution and a filter aid are deposited on the surface of a filtering material, forming a cake layer having voids on the surface of the filtering material. This can prevent the quick increase of filtration pressure difference, allowing stable filtration. In addition, as a sieve effect by physical clearances formed between the filter aid and the insoluble matters can be obtained, the accuracy of filtration is improved. Further, as the aid containing silicon dioxide in 50% or more or a cellulose-based aid is used as the filter aid, the insoluble matters in a cellulose acylate solution are adsorbed by the filter aid, resulting in the improvement of the filtration accuracy.

The thickness of the cake layer is preferably in the range of from 0.1 to 80 mm during the filtration. The thickness within this range can maintain the high accuracy of filtration and suppress the increase of filtration resistance by the cake layer.

In addition, the filtration is preferably carried out at a lower temperature than that for dispersing the filter aid as described above. This can prevent foaming during the filtration, as the filtration is carried out in an environment where the foaming occurs harder than that for dispersing the filter aid. Therefore, it is possible to prevent a cake layer to be broken by the foaming during the filtration and to carry out stable filtration.

Further, the temperature during filtration is preferably carried out at a temperature that is lower than that for dispersing the filter aid, and also at a temperature 20° C. lower than the boiling point of the cellulose acylate solution at normal pressure or higher in a pressure condition where a cellulose acylate solution does not boil. When the filtration is carried out at such a temperature, the viscosity of a dope drops to reduce the resistance of a cake, so that the increase of the pressure difference of filtration can be suppressed.

A flow meter 31 is provided downstream the filter machine 30, and the pump 27 is controlled so that the measured value of the flow meter 31 is constant in the range of, for example, from 0.1 to 50 cm/hr. If the flow rate of filtration is higher than the above-described range, the accuracy of filtration may drop or the filtration pressure may be very high. Conversely, if the flow rate of filtration is too low, the efficiency of filtration may drop. The filtration method is not limited to a constant volume filtration method, but other methods such as a constant pressure filtration method can be adopted.

In addition, the difference of the pressures measured before the filter machine 30 and thereafter is controlled so as to be in the range from 0.01 to 1 MPa in the initial stage of the filtration. Further, during the filtration, the filtration pressure difference is controlled to be in the range from 0.01 to 3 MPa by providing a filtration pressure of from 0.01 to 4 MPa. The initial filtration pressure difference and the filtration pressure difference are preferably low, and if the filtration pressure difference is too high, a cake may become flat. In addition, when the filtration pressure is higher, pressure resistant equipment is required, causing a problem of increasing equipment cost. Therefore, the initial filtration pressure difference, the filtration pressure difference and the filtration pressure are preferably controlled in the above-described range, thereby allowing a low cost filtration without breaking the cake.

The dope 32 filtrated by the filter machine 30 is sent to a filter member 42. As the filter member 42, those having an absolute filtration accuracy of from 2 to 50 μmare used. By the filtration with the filter member 42, the filter aid leaked from the filter machine 30 is collected. The filter aid leaked from the filter machine 30 is preferably limited within the amount collectable by the filter member 42, and the amount of the aid leaked from the filter machine 30 is preferably 10,000 particles/cm³ or less, more preferably 5,000 particles/cm³ or less, and most preferably 1,000 particles/cm³ or less.

The dope 32 passed through the filter member 42 is delivered to a dope tank 33 and stored. This dope 32 is formed to a film by the film-forming apparatus 50 shown in FIG. 2.

Figure 2:
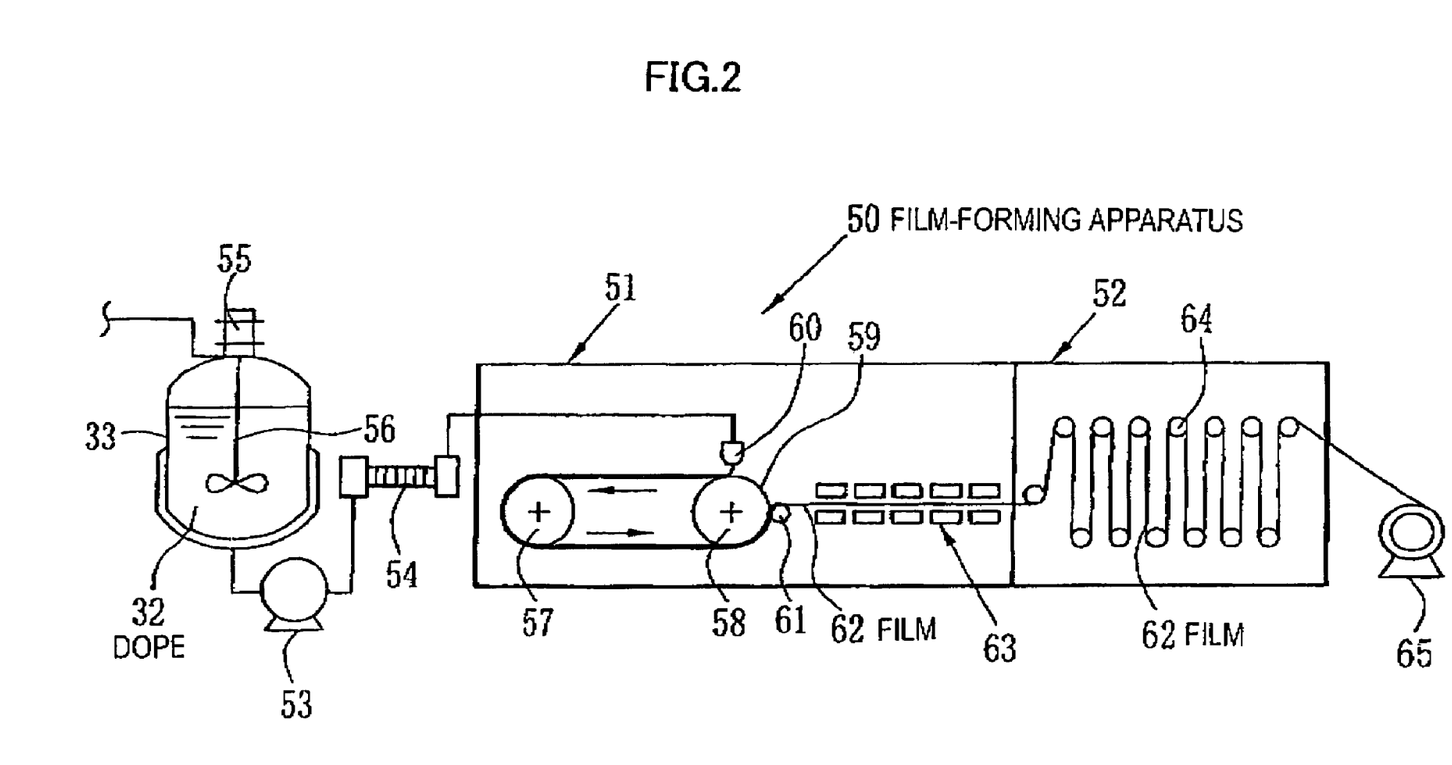
FIG. 2 illustrates a block diagram of a film-forming apparatus.

The film-forming apparatus 50 shown in FIG. 2 is composed of a band zone 51 and a drying zone 52. The dope 32 which is charged in the dope tank 33 is delivered by a pump 53. Next, foreign particles and dust are removed from the dope 32 with a filter 54 before the dope is supplied to a casting die 60 in the band zone 51.

The band zone 51 is provided with a pair of support rollers 57 and 58 and an endless casting band 59 looped over the pair of support rollers 57 and 58. The casting band 59 travels in circulation by rotating the support rollers 57 and 58 by a drive unit (not shown). The above-mentioned casting die 60 is mounted above the casting band 59. When the dope 32 is supplied to the casting die 60, the dope 32 is cast on the casting band 59. The cast dope 32 is dried while conveyed by the casting band 59 and peeled off by a peeling roller 61 when self supporting properties are formed, thus forming a film 62. The film 62 is dried while conveyed by a tenter 63.

The film 62 sent to a drying zone 52 from the tenter 63 is dried in the drying zone 52 while looped over a plurality of rollers 64. The temperature in the drying zone 52 is controlled in the range of from 50 to 150° C., drying the film 62 uniformly. The dried film 62 is wound on a winder 65. Thus, a high quality film 62 is produced. In the high quality film 62, the number of bright point defects observed under crossed-Nicol having a size of 20 μm or more is 0 (defect/5 cm²), from 10 μm to 20 μm is 10 (defects/5 cm²) or less, and from 5 μm to 10 μm is 10 (defects/5 cm²) or less, the number being the average of five samples of 5 cm² in the width direction.

When the filtration is continuously carried out using the filter machine 30, the filtering material in the filter machine 30 is gradually plugged, so that when the filtering material is plugged, the filter machine 30 to carry out the filtration is switched over by the selector 29. In addition, the filter machine 30 in which the filtering material is plugged is cleaned with a cleaning apparatus shown in FIG. 3. Although the cleaning apparatus and a precoat tank 49 are connected to only one of the two filter machines 30 in FIG. 3, the apparatus having the same construction and a precoat tank are connected to the other of the filter machines 30.

Figure 3:
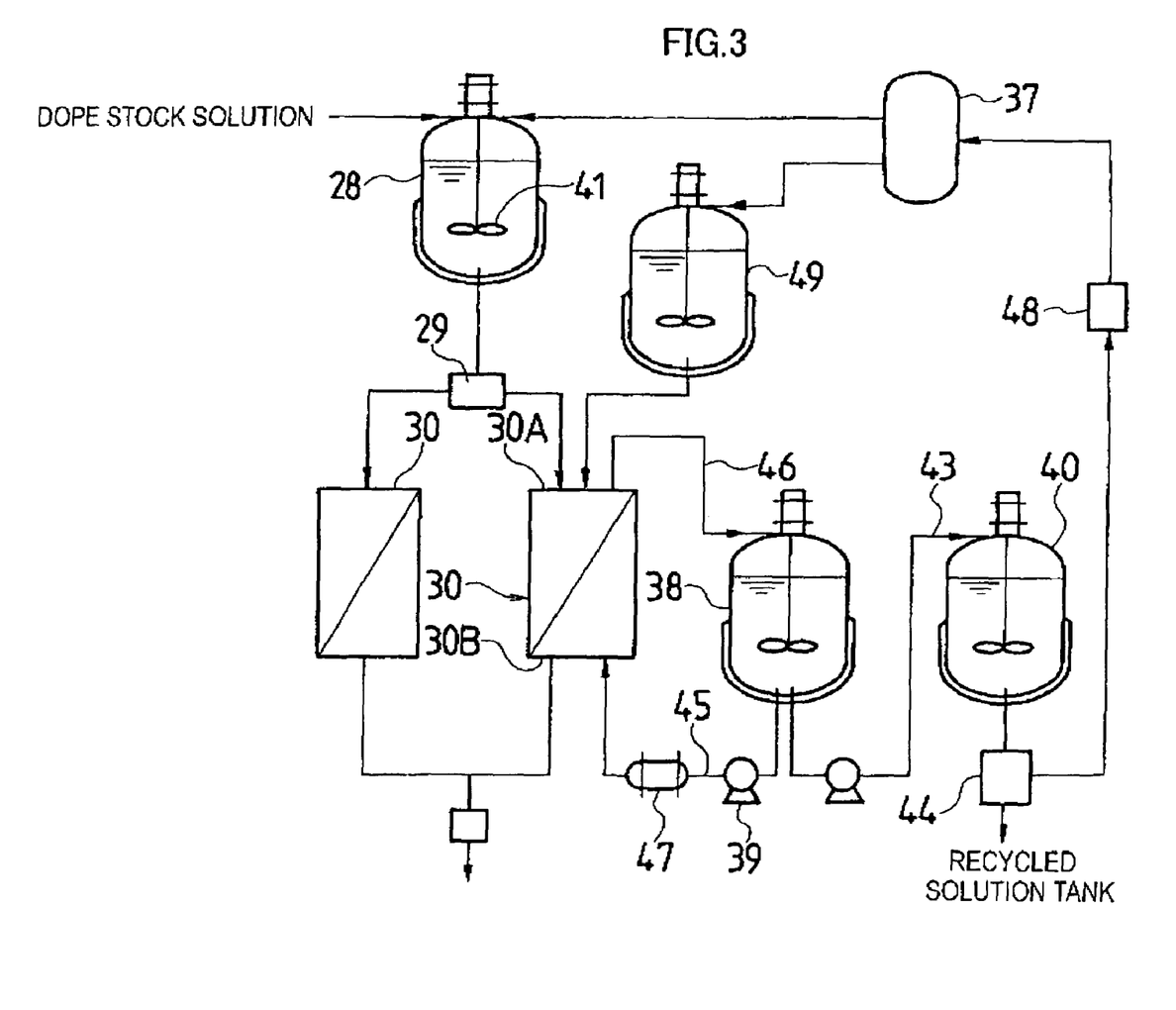
FIG. 3 illustrates a block diagram of the cleaning apparatus of the filter machine according to the present invention.

The cleaning apparatus has a cleaning solvent tank 38 and a discharge tank 40. The cleaning solvent tank 38 is connected to a dope discharge side 30B of the filter machine 30 through a supply line 45 and connected to a dope stock solution supply side 30A of the filter machine 30 through a recovery line 46.

A cleaning solvent is stored in the cleaning solvent tank 38. The cleaning solvent may be that capable of cleaning the filtering material in the filter machine 30. However, the cleaning solvent preferably includes at least one solvent type among the solvent types composing a dope solvent, and most preferably all the solvent types are the same as those for composing the dope solution. Further, the cleaning solvent and other organic solvents used for the solution are preferably non-chlorine-based in view of environmental protection.

The supply line 45 is provided with a pump 39 and a heater 47. The pump 39 is operated when a part (or all) of the dope stock solution in the filter machine 30 is discharged from the filter machine 30, thereby supplying the cleaning solvent in the cleaning solvent tank 38 to the heater 47. An inline mixer such as a multi-tube type heat exchanger or a static-type mixer is used for the heater 47, which heats the cleaning solvent. The heating temperature is set at a temperature that is 20° C. lower than the boiling point of the cleaning solvent at normal pressure or higher in a condition where the cleaning solvent does not boil. The heating of the cleaning solvent before supplying it to the filter machine 30 can improve the cleaning effect of the filter machine 30. The inner pressure of the filter machine 30 may be increased so that the cleaning solvent does not boil.

The cleaning solvent sent to the filter machine 30 passes the filter material in the direction opposite to the dope stock solution at filtration and is recovered by the cleaning solvent tank 38 through the recovery line 46. Thus, the cleaning solvent is supplied to the filter machine 30 in circulation, and the cake formed in the dope stock solution supply side of the filtering material is peeled off the filtering material. The cake after peeling is dispersed in the cleaning solution to form slurry to be discharged from the filter machine 30. When the concentration of the slurry has reached a target value, the slurry is subjected to discharge. Specifically, a part (or all) of the slurry in the cleaning solvent tank 38 is discharged to the discharge tank 40 through the discharge line 43, and a new cleaning solvent is supplied to the cleaning solvent tank 38. The target value of the slurry concentration is set in the range of from 1 to 50 kg/m$^3$. If the concentration is higher than this concentration range, particles in the slurry will aggregate, causing a problem of plugging the discharge line 43 or the recovery line 46. Conversely, if the concentration is too low, there will be a problem of bad efficiency in discharging the cake.

The slurry discharged to the discharge tank 40 is sent to a separating device 44 and separated to solvent and a filter aid. Then, the solvent is delivered to a recycled solution tank 36 shown in FIG. 1 and reused for preparing dope. In addition, the filter aid is sent to a burning device 48 to be burned, regenerating the filter aid. At this time, the burning at 400° C. or higher improves the efficiency for regenerating the filter aid. The regenerated filter aid is returned to a filter aid tank 37 and reused. At this time, the regenerated filter aid may be used singly, but when it is mixed with a virgin filter aid for use, the cost can be extremely reduced without dropping the effect of the filter aid. The mixing ratio of the regenerated filter aid to the virgin filter aid may be approximately 1:1.

The filter aid tank 37 is connected not only to the body feed tank 28 but also to the precoat tank 49. Dope is supplied to the precoat tank 49, and the filter aid is added to the dope. The filter aid is stirred and dispersed by rotating a stirring blade 66, thereby preparing a precoat liquid. The precoat liquid is supplied to the filter machine 30 after the filtering material is cleaned and the cake layer is removed, thereby forming a precoat layer made of the filter aid on the surface of the filtering material. By forming the precoat layer on the surface of the filtering material in this manner, the effect of the filter aid can be obtained even in the initial stage of the filtration. The precoat layer preferably has a thickness in the range of from 0.1 to 10 mm, or has a mass in the range of from 0.1 to 5 kg/m$^2$. If the precoat layer has a thickness and a mass smaller than these ranges, the accuracy of filtration in the initial stage of the filtration will drop. Conversely, if the thickness and mass of the precoat layer are too large, the resistance of the precoat layer during filtration may be too large, reducing the efficiency of the filtration. Therefore, it is preferable to form the precoat layer having the above-described ranges of thickness and mass. In addition, the precoat liquid preferably has a terminal velocity of the filter aid in the range of from 10$^{-4}$ to 1 cm/s. By setting the terminal velocity of the filter aid in this range, the filter aid in the precoat liquid settles uniformly to form a uniform precoat layer.

After the precoat layer is formed, the filtration is carried out again. Specifically, a dope stock solution is supplied from the body feed tank 28 by switching the separator 29. The insoluble matters contained in the dope stock solution and the filter aid are deposited on the surface of the precoat layer to form a cake layer having voids, thereby allowing stable filtration with high filtration accuracy.

Thus, the present embodiments include filtration using a filter aid, thereby improving the absolute filtration accuracy without reducing the pore size of the filtering material. In addition, as the effect of using the filter aid, it is possible to carry out a stable filtration, and to extend a filtration life. Further, when cleaning a filtering material in the filter machine 30, a cleaning solution may be circulated within the system, thereby capable of extremely reducing the load of operators.

EXAMPLES

Filtration was carried out using the dope formulation A under various filtration conditions, and the filtration was stopped when pressure difference reached 1 MPa. Cellulose triacetate (degree of substitution 2.75, SP: 10.9) was mixed in a mixed solvent consisting essentially of methyl acetate (SP: 9.6, 75% by weight), acetone (SP:9.9, 12.5% by weight), methanol (SP; 14.5, 6.25% by weight) and ethanol (SP: 12.7, 6.25% by weight) in a concentration of 19% to prepare the dope formulation A for use.

Example 1

As a filter aid, a $SiO_2$-based filter aid having a composition including $SiO_2$ in 95%, an average particle size of 70 μm, a particle size standard deviation of 20 μm, and a bulk density of 0.45 g/cm$^3$ was used. The filter aid was added in 0.2% at 55° C. for body feed. In addition, a precoat liquid having a terminal velocity of 10$^{-3}$ cm/s was prepared for precoat, and a precoat layer having a thickness of 2 mm and a mass of 0.8 kg/m$^2$ was formed. Then, filtration was started with a filtration flow rate of 0.4 cm/hr and an initial pressure of 0.3 MPa, and the filtration was carried out until the final thickness of a cake layer became 40 mm. The filtration was carried out at a filtration temperature of 50° C. (boiling point 58° C.) and with a saturation of dissolved gas of 85%. After the filtration, the quantity of the aid in the dope was 10 particles/cm$^3$, and the quantity of the aid after the post-filtration by a filter having an average pore size of a filtering material of 0.01 mm was 0 particles/cm$^3$. After the filtration is finished, the cleaning solvent having the same composition as in the dope formulation A was supplied in circulation at 50° C. The cake formed on the filtering material was dispersed in the cleaning solvent to form slurry and discharged at 10 kg/m$^3$. The filtration life (the quantity of filtration per unit area) obtained from these conditions was determined, and it was defined as 1 and compared with the results from the following examples. As for the dope quality, a film was prepared and evaluated. The results showed that the number of bright point defects observed under crossed-Nicol having a size of 20 μm or more (designated as (1) below) was 0 defect/5 cm$^2$, from 10 μm to 20 μm (designated as (2) below) was 9 defects/S cm$^2$, and from 5 μm to 10 μm (designated as (3) below) was 3 defects/5 cm$^2$, the number being the average of five samples of 5 cm$^2$ in the width direction.

Example 2

As a filter aid, a cellulose-based filter aid having a bulk density of 0.1 g/cm$^3$ was used, and the initial pressure was set at 0.4 MPa. Filtration was carried out under the same conditions as Example 1 except the above-described conditions. According to the results, the quantity of the aid in the dope after the filtration was 1 particle/cm$^3$ and the filtration life was 0.8. In addition, the result of film evaluation was: (1) 0 defect/5 cm$^2$, (2) 5 defects/5 cm$^2$, and (3) 1 defect/5 cm$^2$. Thus, sufficient effect can also be obtained by using a cellulose-based filter aid.

Example 3

Filtration was carried out under the same conditions as Example 1 except using the aid prepared by mixing the aid used in Example 1 and the one used in Example 2 in the ratio of 1:1. According to the results, the quantity of the aid in the dope after the filtration was 3 particles/cm$^3$ and the filtration life was 0.95. In addition, the result of film evaluation was: (1) 0 defect/5 cm$^2$, (2) 5 defects/5 cm$^2$, and (3) 1 defect/5 cm$^2$. Thus, it is understand that the cellulose-based aid and the aid including SiO$_2$ in 50% or more may be mixed.

Example 4

Filtration was carried out under the same conditions as Example 1 except that the aid used in Example 1 was burned at 800° C. According to the results, the quantity of the aid in the dope after the filtration was 3 particles/cm$^3$ and the filtration life was 0.98. In addition, the result of film evaluation was: (1) 0 defect/5 cm$^2$, (2) 10 defects/5 cm$^2$, and (3) 4 defects/5 cm$^2$. Thus, it is understood that sufficient effect can be obtained by regenerating the aid by burning at 800° C.

Example 5

Filtration was carried out under the same conditions as Example 1 except that the aid used in Example 1 was burned at 800° C. and mixed with a virgin filter aid of the same type in the ratio of 1:1. According to the results, the filtration life was 0.985. In addition, the result of film evaluation was: (1) 0 defect/5 cm$^2$, (2) 10 defects/5 cm$^2$, and (3) 3 defects/5 cm$^2$.

Comparative Example 1

Filtration was carried out under the same conditions as Example 1 except that a filter aid having a composition including SiO$_2$ in 48% was used as a filter aid. According to the results, the filtration life was 0.98, which was good. However, the result of film evaluation was: (1) 1 defect/5 cm$^2$, (2) 12 defects/5 cm$^2$, and (3) 12 defects/5 cm$^2$, showing that sufficient quality was not obtained. Thus, it is understood that the SiO$_2$ composition is preferably 50% or higher.

Comparative Example 2

Filtration was carried out under the same conditions as Example 1 except that SiO$_2$ having an average particle size of 155 μm was used as a filter aid and the initial pressure was set at 0.2 MPa. According to the results, the filtration life was 1.2, which was good. However, the result of film evaluation was: (1) 4 defects/5 cm$^2$, (2) 20 defects/5 cm$^2$, and (3) 22 defects/5 cm$^2$, showing that sufficient quality was not obtained. Thus, it is understood that the average particle size of a filter aid is preferably 150 μm or loss.

Comparative Example 3

Filtration was carried out under the same conditions as Example 1 except that the SiO$_2$ having an average particle size of 0.5 μm was used as a filter aid and the initial pressure was set at 0.8 MPa. According to the results, the filtration life was 0.5, which was short. Thus, it is understood that the average particle size of a filter aid is preferably 1.0 μm or more. The result of film evaluation was: (1) 0 defect/5 cm$^2$, (2) 2 defects/5 cm$^2$, and (3) 2 defects/5 cm$^2$, showing that sufficient quality was obtained.

Comparative Example 4

Filtration was carried out under the same conditions as Example 1 except that the SiO$_2$ having a particle size standard deviation of 40 μm was used as a filter aid and the initial pressure was set at 0.35 MPa. According to the results, the quantity of the aid in the dope after the filtration was 100,000 particles/cm$^3$, and the quantity of the aid after filtrated with a filter was 10 particles/cm$^3$, showing that numbers of the aid leaked. Thus, the filter aid preferably has a particle size standard deviation of 0.5 times the average particle size or smaller. Further, the filtration life was 0.95, and the result of film evaluation was: (1) 0 defect/5 cm$^2$, (2) 5 defects/5 cm$^2$, and (3) 2 defects/5 cm$^2$, showing good results.

Comparative Example 5

The filter aid used in Example 1 was added in 15%. According to the results, the quantity of the aid in the dope after the filtration was 20 particles/cm$^3$, and the quantity of the aid leaked increased to some extent, but it was able to completely remove with a filter (0 particle/cm$^3$). However, the filtration life was 0.1, which was very short. Thus, the addition quantity of the filter aid is preferably 10% or less. On the other hand, the result of film evaluation was: (1) 0 defect/5 cm$^2$, (2) 5 defects/5 cm$^2$, and (3) 2 defects/ 5 cm$^2$, showing good results.

Comparative Example 6

The addition quantity of the filter aid in Example 1 was changed to 0.005%. According to the results, the filtration life decreased to 0.5. Thus, the addition quantity of the filter aid is preferably 0.01% or more. The result of film evaluation was: (1) 3 defects/5 cm$^2$, (2) 10 defects/5 cm$^2$, and (3) 8 defects/5 cm$^2$.

Comparative Example 7

A precoat layer having a thickness of 15 mm and a mass of 6 kg/cm$^2$ was formed using the precoat liquid used in Example 1. Then, filtration was carried out under the same conditions as Example 1 except the initial pressure of 1 MPa. According to the results, the filtration life was 0.1, showing significant reduction. Thus, it is understood that larger thickness and mass of the precoat layer cause a problem in terms of filtration life. Therefore, the precoat layer preferably has a thickness of 10 mm or less and a mass of 5 kg/m$^2$ or less. On the other hand, the result of film evaluation was: (1) 0 defect/5 cm$^2$, (2) 1 defect/5 cm$^2$, and (3) 1 defect/5 cm$^2$, showing good results.

Comparative Example 8

Using the same filter aid as in Example 1, a precoat liquid having a terminal velocity of the filter aid of 2 cm/s was prepared, and a precoat layer having a thickness of from 0.1 to 3 nun and a mass of 0.8 kg/m$^2$ was formed. Then, filtration was carried out under the same conditions as Example 1. According to the results, the quantity of the leaked filter aid increased, and the quantity of the aid in the dope after the filtration significantly increased to 100,000 particles/cm$^3$. In addition, the aid of 100 particles/cm$^3$ remained even after filtrating with a filter having an average pore size of a filtering material of 0.01 mm. Further, a problem of the precoat layer having a nonuniform thickness occurred. Thus, the terminal velocity of the filtering aid is preferably 1 cm/s or less.

Comparative Example 9

Filtration was carried out under the same conditions as Example 1 except that filtration flow rate was set at 51 cm/hr and the initial pressure was set at 1.5 MPa. According to the results, the quantity of the leaked filter aid increased, and the quantity of the aid in the dope after the filtration significantly increased to 300,000 particles/cm$^3$. In addition, the aid of 1,000 particles/cm$^3$ remained even after filtrating with a filter having an average pore size of a filtering material of 0.01 mm. Further, the filtration life was 0.05, which was very short, and the result of film evaluation was: (1) 10 defects/5 cm$^2$, (2) 25 defects/5 cm$^2$, and (3)28 defects/5 cm$^2$, showing reduction of quality. Thus, it is preferable to set the initial pressure at 1 MPa or less and the filtration flow rate at 50 cm/hr or less.

Comparative Example 10

Filtration was carried out under the same conditions as Example 1 except that filtration temperature at the filtration was set at 20° C. (boiling point 58° C.), saturation of dissolved gas was set at 89% and initial pressure was set at 0.5 MPa. According to the results, the quantity of the aid in the dope after the filtration was 10 particles/cm$^3$, and the quantity of the aid after filtrating with a filter having an average pore size of a filtering material of 0.01 mm was 0 particle/cm$^3$, which was good, but filtration life dropped to 0.7. Thus, the filtration temperature is preferably set at 20 degree lower than the boiling point of the cellulose acylate solution (38° C.) or higher.

Comparative Example 11

Filtration was carried out under the same conditions as Example 1 except that filtration temperature at the filtration was set at 57° C. (boiling point 58° C.), saturation of dissolved gas was set at 89% and initial pressure was set at 0.5 MPa. According to the results, the quantity of the leaked filter aid increased, the quantity of the aid in the dope after the filtration increased to 100,000 particles/cm$^3$, and the quantity of the aid after filtrating with a filter having an average pore size of a filtering material of 0.01 mm was 1,000 particles/cm$^3$. From these results, it is known that when a filtration temperature is high and a part of the cellulose acylate solution boils, a cake is broken and the filter aid leaks. Thus, it is preferable to carry out the filtration under a pressure condition where boiling is securely prevented. On the other hand, the filtration life was 1.01, and the result of film evaluation was: (1) 0 defect/5 cm$^2$, (2) 11 defects/5 cm$^2$, and (3) 11 defects/5 cm$^2$, showing good quality although a little drop was observed.

Comparative Example 12

A filter material having an average pore size of 80 μm was used as a filter after filtration, and a dope having the aid therein after the filtration in a quantity of 10 particles/cm$^3$ was filtrated with the filter. According to the results, the quantity of the aid in the dope increased to 5 particles/cm$^3$, showing the leak of the aid. Thus, the filter after filtration preferably has an average pore size of a filtering material of smaller than 80 μm, that is, 50 μm or less.

Comparative Example 13

A filtering material having an average pore size of 1 μm was used as a filter after filtration. According to the results, it was possible to completely collect the leaked filter aid with the filter, but pressure soon increased, preventing a filtered dope from being obtained.

Comparative Example 14

During cleaning, a cake was discharged at 70 kg/m$^3$ as slurry. According to the results, the filtration aid aggregated and precipitated in the piping, dropping the recovery ratio of the aid to 98%.

Comparative Example 15

The filter aid used in Example 1 was burned at 300° C. and a similar filtration experiment was carried out again. According to the results, the filtration life dropped to 0.8. In addition, the result of film evaluation was: (1) 3 defects/5 cm$^2$, (2) 15 defects/5 cm$^2$, and (3) 12 defects/5 cm$^2$, showing a little reduction of quality. Thus, it is preferable to burn the filter aid at a higher temperature, more preferably at 400° C. or higher, in terms of the regeneration ratio of the filter aid.

Next, co-casting was carried out using the dope formulation A together with a sidestream comprising a dope having the same composition as the formulation A in a concentration of 17%, preparing a triacetyl cellulose film having a thickness of 80 μm. The film was applied with a coating solution for a hard coat layer using a bar-coater and dried at 120° C. Then, the coating layer was irradiated with ultraviolet light having an illumination of 400 mW/cm$^2$ and a dose of 300 J/cm$^2$ using an air-cooled metal halide lamp of 160 W/cm (made by Eyegraphics Co., Ltd.) to be cured to form a hard coat layer having a thickness of 2.5 μm. A coating solution for an antiglare layer was applied thereon with a bar-coater and dried and UV-cured at the same conditions as those for the hard coat layer to form the antiglare layer having a thickness of about 1.5 μm. A coating solution for a low refractive index layer was coated with a bar-coater, dried at 80° C. and further subjected to thermal crosslinking at 120° C. for 10 minutes to form a low refractive index layer having a thickness of 0.096 μm. The coating solutions for the hard coat layer, for the antiglare layer and for the low refractive index layer will be described at the end of the examples.

The resultant films were evaluated for the following items.

(1) Mirror Reflectivity and Color

Spectrophotometer V-550 (made by JASCO Corporation) was mounted with an adaptor ARV474; mirror reflectivity for an angle of emergence of −5° at an angle of incidence of 5° was measured in a wavelength region of from 380 to 780=n; average reflectivity in a wavelength region of from 450 to 650 nm was determined by calculation; and the antireflection property was evaluated.

In addition, from the measured reflection spectrum, the L* value, a* value, and b* value in the CIE 1976 L*a*b* color space that indicates the color of the specular reflection light to an incident light of 5° of CIE standard source D65 was determined by calculation, and the color of the reflected light was evaluated.

(2) Integrated Reflectivity

Spectrophotometer V-550 (made by JASCO Corporation) was mounted with an adaptor ILV471; integral reflectivity at an angle of incidence of 5° was measured in a wavelength region of from 380 to 780 nm; and average reflectivity in a wavelength region of from 450 to 650 nm was determined by calculation.

(3) Haze

The obtained film was measured for haze with a haze meter MODEL 1001DP (made by Nippon Denshoku Industries Co., Ltd.).

(4) Evaluation of Pencil Hardness

As an index of scratch resistance, pencil hardness as described in JIS K 5400 was evaluated. The antireflective film was conditioned at a temperature of 25° C. and a humidity of 60% RH for 2 hours before subjected to the pencil hardness test using a test pencil of 3H as defined in JIS S 6006 and a load of 1 kg. The results were evaluated by the following standard:

| | |
|---|---|
| No scratch was observed in the evaluation of n = 5 | B |
| One or two scratches were observed in the evaluation of n = 5 | C |
| Three or more scratches were observed in the evaluation of n = 5 | F |

(5) Contact Angle Measurement

As an index of stain resistance of the surface, the optical material was conditioned at a temperature of 25° C. and a humidity of 60% RH for 2 hours before subjected to the measurement of contact angle relative to water, which is the index of fingerprint adhesion.

(6) Coefficient of Kinetic Friction

As an index of surface slip properties, coefficient of kinetic friction was evaluated. For obtaining the coefficient of kinetic friction, the test sample was conditioned at a temperature of 25° C. and a relative humidity of 60% for 2 hours before subjected to the measurement by HEIDON-14 kinetic friction tester using a stainless steel ball with a diameter of 5 mm and a load of 100 g at a speed of 60 cm/min.

(7) Evaluation of Antiglare

A bare fluorescent lamp without a louver (8,000 cd/m$^2$) was reflected on the prepared antiglare film, and the extent of blurring was evaluated by the following standard.

| | |
|---|---|
| The profile of a fluorescent lamp is completely invisible | A |
| The profile of a fluorescent lamp is slightly visible | B |
| A fluorescent lamp is blurred, but the profile is distinguishable | C |
| A fluorescent lamp is visible with almost no blurring | F |

The results of evaluation based on the above items are shown in Table 1. As shown in the table, the obtained film was excellent in antiglare and antireflection property, and less colored, and had good evaluation results reflecting film properties such as pencil hardness, fingerprint adhesion and a coefficient of kinetic friction.

Next, an antiglare antireflective polarizing plate was prepared using the obtained film. When a liquid crystal display device in which the antireflective layer is placed on the top surface was prepared using the polarizing plate, excellent contrast was obtained as no extraneous light was reflected; reflection images was inconspicuous by the antiglare; and visibility and fingerprint adhesion were also excellent.

(Preparation of an Antiglare Layer Coating Solution)

A mixture of dipentaerythritol pentaacrylate and dipentaerythritol hexaacrylate (DPHA, made by Nippon Kayaku Co., Ltd.) of 125 g, bis(4-methacryloylthiophenyl)sulfide (MPSMA, made by Sumitomo Seika Chemicals Co., Ltd.) of 125 g were dissolved in 439 g of a mixed solvent of methyl ethyl ketone/cyclohexanone=50/50% by weight. The obtained solution was added with a solution in which a photopolymerization initiator (Irgacure 907, made by Ciba-Geigy Ltd.) of 5.0 g and a photosensitizer (Kayacure DETX, made by Nippon Kayaku Co., Ltd.) of 3.0 g were dissolved in 49 g of methyl ethyl ketone. The obtained solution was applied and UV-cured to obtain a coating film having a refractive index of 1.60.

Further, the solution was added with 10 g of a crosslinked polystyrene particle having an average particle size of 2 μm (Trade name: SX-200H, made by Soken Chemicals & Engineering Co., Ltd.) and stirred with a high speed Dispa at 5,000 rpm for 1 hour before filtrated with a polypropylene filter having a pore size of 30 μm, preparing a coating solution for an antiglare layer.

(Preparation of a Coating Solution for a Hard Coat Layer)

A solution in which a UV-curable hard coat composition (DeSolite KZ-7689, 72% by weight, made by JCR Co., Ltd.) of 250 g was dissolved in 62 g of methyl ethyl ketone and 88 g of cyclohexanone was added. The obtained solution was applied and UV-cured to obtain a coating film having a refractive index of 1.53.

Further, the solution was filtrated with a polypropylene filter having a pore size of 30 μm, preparing a coating solution for a hard coat layer (Preparation of a Coating Solution for a Low Refractive Index Layer)

A thermally crosslinkable fluorine-containing polymer (TN-049, made by JSR Co., ltd.) having a refractive index of 1.42 of 20,093 g was added with 8 g of MEK-ST (an MEK dispersion of a SiO$_2$ sol having an average particle size of from 10 to 20 nm and a solid content of 30% by weight, made by Nissan Chemical Industries Ltd.) and 100 g of ethyl methyl ethyl ketone, and stirred before filtrated with a polypropylene filter having a pore size of 1 μm, preparing a coating solution for a low refractive index layer.

As described above, the solution film-forming method according to the present invention comprises filtration of a cellulose acylate solution using a filter aid, thereby capable of suppressing the plug of a filtering material, extending filtration life and improving the accuracy of filtration.

It should be understood, however, that there is no intention to limit the invention to the specific forms disclosed, but on the contrary, the invention is to cover all modifications, alter-

TABLE 1

| Average reflectivity (%) | | Haze | Pencil hardness | Contact angle | Color | Coefficient of kinetic | Surface condition of | |
|---|---|---|---|---|---|---|---|---|
| Mirror | Integrated | (%) | (3H) | (°) | L*/a*/b* | friction (−) | Antiglare | coating film |
| 1.1 | 2.0 | 8 | B | 103 | 10/1.9/1.3 | 0.08 | A | A |

What is claimed is:

1. A solution film-forming method for producing a cellulose acylate film comprising steps of:
   (a) preparing a cellulose acylate solution;
   (b) filtering the cellulose acylate solution by a cake layer supported by a filtration support, the cake layer being formed by pre-coating a filter aid to the support, said filtering step removing all particles having a diameter of 0.01 mm or larger; and
   (c) forming a film from the cellulose acylate solution obtained in step (b);
   wherein said method further comprises, prior to the filtering step, a step of precoating the filtration support in a thickness of from 0.5 to 10 mm using a precoat liquid in which the filter aid is dispersed, wherein the filter aid has an average particle size in a range of from 1 to 150 µm;
   wherein:
   (i) the cellulose acylate film produced by said method is used for a liquid crystal display device;
   (ii) a number of bright point defects observed under crossed-Nicol having a size of 20 µm or more is 0 defect/5 cm$^2$, 10 µm or more is 10 defects/5 cm$^2$ or less, and 5 µm or more is 10 defects/5 cm$^2$ or less, said number being an average of five samples of 5 cm$^2$ in a width direction.

2. The solution film-forming method according to claim 1, wherein the filter aid has a composition including $SiO_2$ in 50% or more.

3. The solution film-forming method according to claim 1, wherein the filter aid is a cellulose-based aid.

4. The solution film-forming method according to claim 1, wherein the filter aid is a mixture of a cellulose-based aid and another aid including $SiO_2$ in 50% or more.

5. The solution film-forming method according to claim 1, wherein the filter aid comprises a mixture of two or more filter aids.

6. The solution film-forming method according to claim 1, wherein the filter aid has a standard deviation of particle size of 0.5 times an average particle size or smaller.

7. The solution film-forming method according to claim 1, wherein the filter aid has a bulk density in a range of from 0.01 to 0.8 g/cm$^3$.

8. The solution film-forming method according to claim 1, wherein the filter aid is added to the cellulose acylate solution in an amount of from 0.01 to 10% by weight.

9. The solution film-forming method according to claim 1, wherein the precoat liquid has a terminal velocity of the filter aid in a range of from $10^{-4}$ to 1 cm/s.

10. The solution film-forming method according to claim 1, wherein the filtering step is carried out through a filtration support, the method further comprising, prior to the filtering step, a step of precoating the filtration support in a mass of from 0.1 to 5 kg/m$^2$ using a precoat liquid in which the filter aid is dispersed.

11. The solution film-forming method according to claim 10, wherein the precoat liquid has a terminal velocity of the filter aid in a range of from $10^{-4}$ to 1 cm/s.

12. The solution film-forming method according to claim 1, wherein a flow rate in the filtering step is in a range of from 0.1 to 50 cm/hr.

13. The solution film-forming method according to claim 1, wherein initial pressure difference in the filtering step is in a range of from 0.01 to 1 MPa.

14. The solution film-forming method according to claim 1, wherein filtration pressure in the filtering step is in a range of from 0.01 to 4 MPa.

15. The solution film-forming method according to claim 1, wherein pressure difference in the filtering step is in a range of from 0.01 to 3 MPa.

16. The solution film-forming method according to claim 1, wherein a thickness of a cake layer formed in the filtering step is in a range of from 0.1 to 80 mm.

17. The solution film-forming method according to claim 1, wherein the filtering step is carried out in a pressure condition where the cellulose acylate solution does not boil and at a temperature 20° C. lower than a boiling point of the cellulose acylate solution at normal pressure or higher.

18. The solution film-forming method according to claim 1, wherein the filtering step comprises steps of:
   (i) dispersing the filter aid in the cellulose acylate solution at a temperature in a range of from a boiling point of the cellulose acylate solution at normal pressure to a temperature 20° C. lower than the boiling point, and
   (ii) filtering the filter-aid dispersed cellulose acylate solution obtained in step (i) having a saturation of dissolved air bubble of 90% or lower.

19. The solution film-forming method according to claim 1, wherein the filtering step comprises steps of:
   (i) dispersing the filter aid in the cellulose acylate solution, and
   (ii) filtering the filter-aid dispersed cellulose acylate solution obtained in step (i) at a temperature lower than that of step (i).

20. The solution film-forming method according to claim 1, wherein a concentration of the filter aid in the cellulose acylate solution is 10,000 particles/cm$^3$ or less after the filtering step.

21. The solution film-forming method according to claim 1, further comprising, prior to step (c), a step of post-filtering the cellulose acylate solution after the filtering step through a filter having an absolute filtration accuracy of from 2 to 50 µm.

22. The solution film-forming method according to claim 1, wherein the filtering step is carried out in a filter machine, the method further comprising, following the filtering step, a step of backwashing the filter machine by supplying a cleaning solvent in circulation, in a pressure condition where the cleaning solvent does not boil, after being heated to a temperature 20° C. lower than a boiling point of the cellulose acylate solution or higher.

23. The solution film-forming method according to claim 22, wherein the cleaning solvent is a non-chlorine organic solvent.

24. The solution film-forming method according to claim 1, wherein the filtering step is carried out through a filtration support, the method further comprising, following the filtering step, a step of discharging a cake formed on the filtration support as a slurry having a concentration in a range of from 1 to 50 kg/m$^3$.

25. The solution film-forming method according to claim 24, wherein the slurry is reused as at least one of a precoat liquid and a body feed liquid.

26. The solution film-forming method according to claim 24, further comprising, following the discharging step, steps of:
   (i) separating the discharged slurry of the cake to a solvent and the filter aid, and
   (ii) burning the filter aid at 400° C. or higher for reuse.

27. The solution film-forming method according to claim 26, further comprising, following the burning step, a step of mixing the burned filter aid with a virgin filter aid for use.

28. The solution film-forming method according to claim 1, wherein the forming step is carried out by co-casting.

* * * * *